(12) United States Patent
McDowell, III

(10) Patent No.: US 11,603,241 B2
(45) Date of Patent: Mar. 14, 2023

(54) ADJUSTABLE TIGHTENING APPARATUS

(71) Applicant: KML Holding Group LLC, Quakertown, PA (US)

(72) Inventor: George R. McDowell, III, Hellertown, PA (US)

(73) Assignee: KML Holding Group LLC, Quakertown, PA (US)

( * ) Notice: Subject to any disclaimer, the term of this patent is extended or adjusted under 35 U.S.C. 154(b) by 202 days.

(21) Appl. No.: 17/182,189

(22) Filed: Feb. 22, 2021

(65) Prior Publication Data
US 2021/0206553 A1    Jul. 8, 2021

Related U.S. Application Data

(63) Continuation-in-part of application No. 16/202,508, filed on Nov. 28, 2018, now Pat. No. 10,926,929.

(60) Provisional application No. 62/593,908, filed on Dec. 2, 2017.

(51) Int. Cl.
    *B65D 63/10*    (2006.01)
(52) U.S. Cl.
    CPC .... *B65D 63/1045* (2013.01); *B65D 2563/107* (2013.01)
(58) Field of Classification Search
    CPC .......... B65D 63/1045; B65D 2563/107; B65D 63/1072; F16L 3/2336; H02G 3/32
    See application file for complete search history.

(56) References Cited

U.S. PATENT DOCUMENTS

| | | | |
|---|---|---|---|
| 3,747,164 A | | 7/1973 | Fortsch |
| 3,855,669 A | * | 12/1974 | Meyer ................ B65D 63/1072 24/16 PB |
| 3,908,233 A | | 9/1975 | Caveny |
| 3,991,444 A | | 11/1976 | Bailey |

(Continued)

FOREIGN PATENT DOCUMENTS

| | | |
|---|---|---|
| CN | 204197468 U | 3/2015 |
| TW | M541983 B1 | 5/2017 |

(Continued)

OTHER PUBLICATIONS

PCT International Search Report, International Application No. PCT/US2018/062873, dated Feb. 15, 2019 (2 pages).

(Continued)

*Primary Examiner* — David M Upchurch
(74) *Attorney, Agent, or Firm* — Douglas J. Ryder; Ryder, Mazzeo & Konieczny LLC

(57) ABSTRACT

A tie to secure items therewithin that can be loosened or released to allow the items to be removed therefrom and the tie to be reused. The tie includes an elongated strap having teeth formed thereon that engage with teeth in a locking head to allow movement in only one direction (tightening). A release pad in conjunction with a backplate enables the teeth in the locking head to be disengaged from the teeth on the elongated strap when the release pad is depressed so that the strap can move in an opposite direction (removal). The release pad and the backplate are configured to face away from the items secured within the strap to provide more room for engagement (e.g., by a user's hand) and provide necessary leverage to release the cable tie without need to press the tie against other items (e.g., cables, chassis).

23 Claims, 5 Drawing Sheets

(56) References Cited

U.S. PATENT DOCUMENTS

| | | | | |
|---|---|---|---|---|
| 4,236,280 | A * | 12/1980 | Kreiseder | B65D 63/1072 24/301 |
| 4,287,644 | A | 9/1981 | Durand | |
| 4,805,856 | A | 2/1989 | Nicoli | |
| 4,813,105 | A | 3/1989 | Espinosa | |
| 5,193,250 | A | 3/1993 | Caveny | |
| 5,577,698 | A | 11/1996 | Liu | |
| 5,697,455 | A | 11/1997 | Alexander | |
| 5,758,390 | A | 6/1998 | Villeneueve | |
| 5,890,265 | A | 4/1999 | Christian | |
| 5,901,416 | A | 5/1999 | Mears | |
| 6,185,791 | B1 * | 2/2001 | Khokhar | B65D 63/1063 24/16 PB |
| 7,017,237 | B2 * | 3/2006 | Magno, Jr. | F16L 3/2334 24/16 PB |
| 7,866,005 | B2 | 1/2011 | Vermeer | |
| 8,281,462 | B2 * | 10/2012 | Kuhne | H02G 3/32 24/17 AP |
| 8,499,419 | B2 | 8/2013 | Cheng | |
| 8,955,198 | B2 | 2/2015 | Carnevali | |
| 9,820,752 | B2 | 11/2017 | O'Neill | |
| 2003/0229972 | A1 * | 12/2003 | Welch | F16L 3/2332 24/16 PB |

FOREIGN PATENT DOCUMENTS

| | | |
|---|---|---|
| TW | D186957 S | 12/2017 |
| TW | D187765 S | 1/2018 |
| WO | WO/1990/011945 A1 | 10/1990 |

OTHER PUBLICATIONS

Extended European Search Report, Application No. EP18884746, dated Jul. 22, 2021 (7 pages).

* cited by examiner

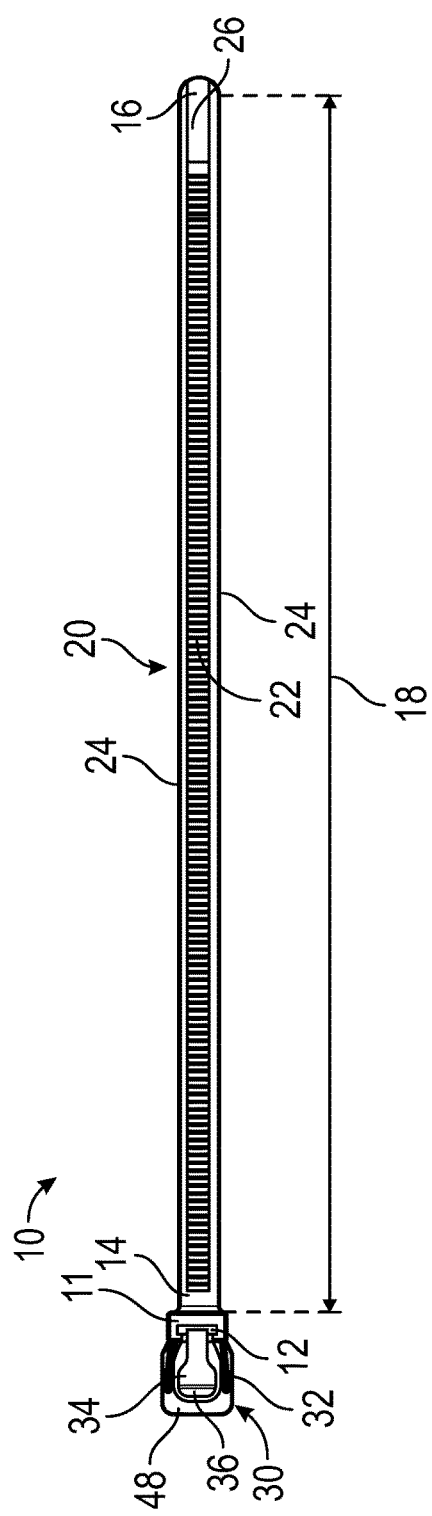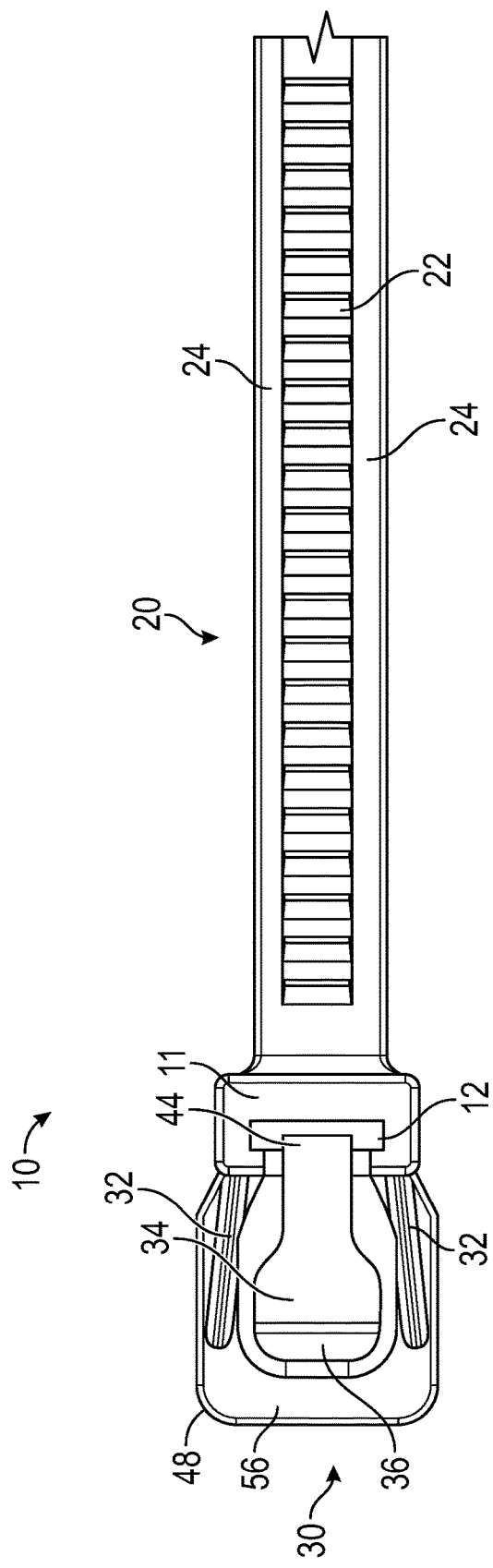

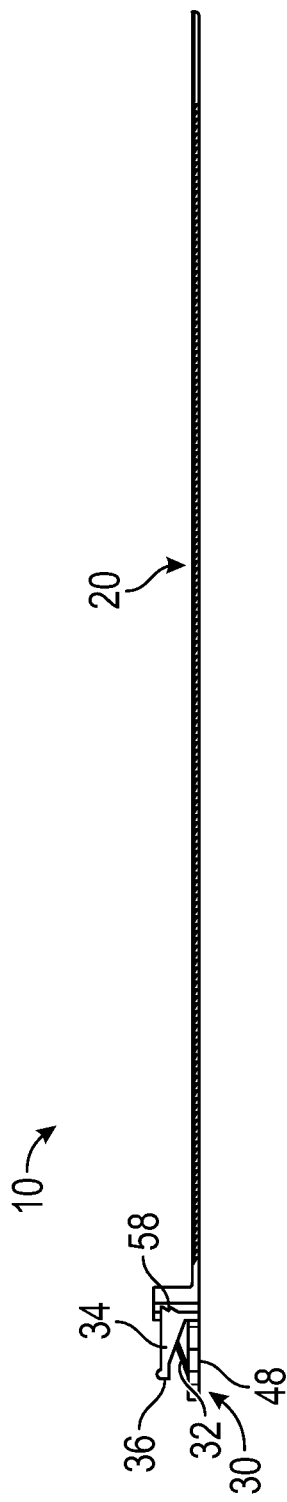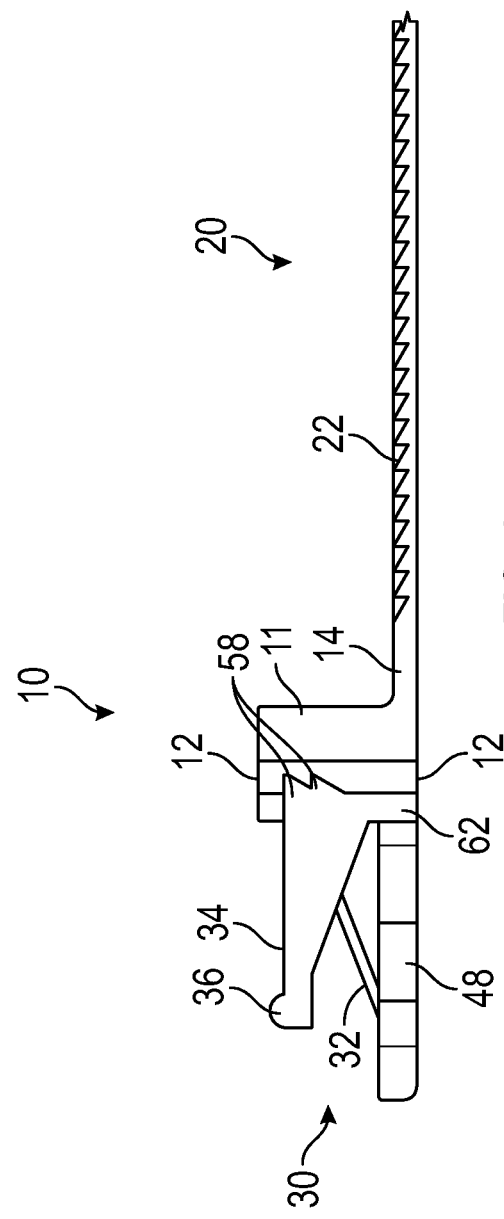

ADJUSTABLE TIGHTENING APPARATUS

PRIORITY

This application is a continuation-in-part (CIP) of and claims the benefit under 35 U.S.C. § 120 of U.S. patent application Ser. No. 16/202,508 filed Nov. 28, 2018 (issued as U.S. Pat. No. 10,926,929 on Feb. 23, 2021). U.S. application Ser. No. 16/202,508 claims the priority under 35 U.S.C. § 119 of Provisional Application Ser. No. 62/593,908 filed on Dec. 2, 2017. U.S. application Ser. No. 16/202,508 and 62/593,908 are incorporated herein by reference in its entirety.

BACKGROUND

Ties are used to tie, fasten and/or connect various items. For example, ties may be used to secure a cable (e.g., power cord) that is wrapped in a bundle for storage together in the bundle. Ties may be used to secure different cables (e.g., power cords, data cables, other cables) that are traversing a similar path together for organization. Ties may be used to secure different cables to other objects, such as to a desk, chassis or the like they are being utilized in. Ties, often known as zip ties, are designed for easy application. The zip ties may include an elongated body with teeth and a head through which the body may traverse in a single direction associated with tightening the tie. The zip tie may be placed around the cables to be secured together or around the cables and object that are to be secured to and then may be tightened by placing the body through the head until the desired tightness is achieved. Typical zip ties cannot be loosened or removed and are thus designed for a single use.

Accordingly, to remove or loosen a zip tie it must be cut. Zip ties may need to be removed or loosened for various reasons including, for example, removing a cable from a bundle of cables, rerouting one or more cables secured therein, or adding a cable to the bundle of cables. If the cables are still to be bundled and/or held in place a new zip tie must then be utilized. The process of cutting and removing existing ties and routing and securing new ties is not only inconvenient and costly, but may lead to damage to the cables secured therein. Damaging one or more cables in a wire harness (bundle of cables) may require the whole wire harness to be replaced. The replacement of wire harnesses is a problem for large production jobs, such as large airliners, as the airlines may include miles and miles of electrical cables that need to be replaced, rerouted and resecured.

Releasable cable ties have been proposed but they are not designed to be easily released when they have been used to secure a plurality of cables therein in tight spaces and a user may be wearing gloves. Typical releasable cable ties do not provide a configuration that provides an arrangement where the release mechanism faces away from the cables secured therein to provide more room for a user's hand to be utilized to release the tie, the release mechanism provides a configuration that enables a user to engage therewith whether wearing gloves or not, and/or the release mechanism provides a user with necessary leverage to release the cable tie. What is needed is a releasable cable tie that provides these features.

BRIEF DESCRIPTION OF THE DRAWINGS

The structure, objects, and advantages of the releasable cable tie will be understood by referring to the detailed description of illustrative embodiments in conjunction with the accompanying technical drawings, in which:

FIG. 1 illustrates a top view of an example releasable cable tie, according to one embodiment.

FIG. 2 illustrates a close-up top view of an example releasable cable tie, according to one embodiment.

FIG. 3 illustrates a cross sectional side view of an example releasable cable tie, according to one embodiment.

FIG. 4 illustrates a close-up cross sectional side view of an example releasable cable tie, according to one embodiment.

DETAILED DESCRIPTION

Figure 5:
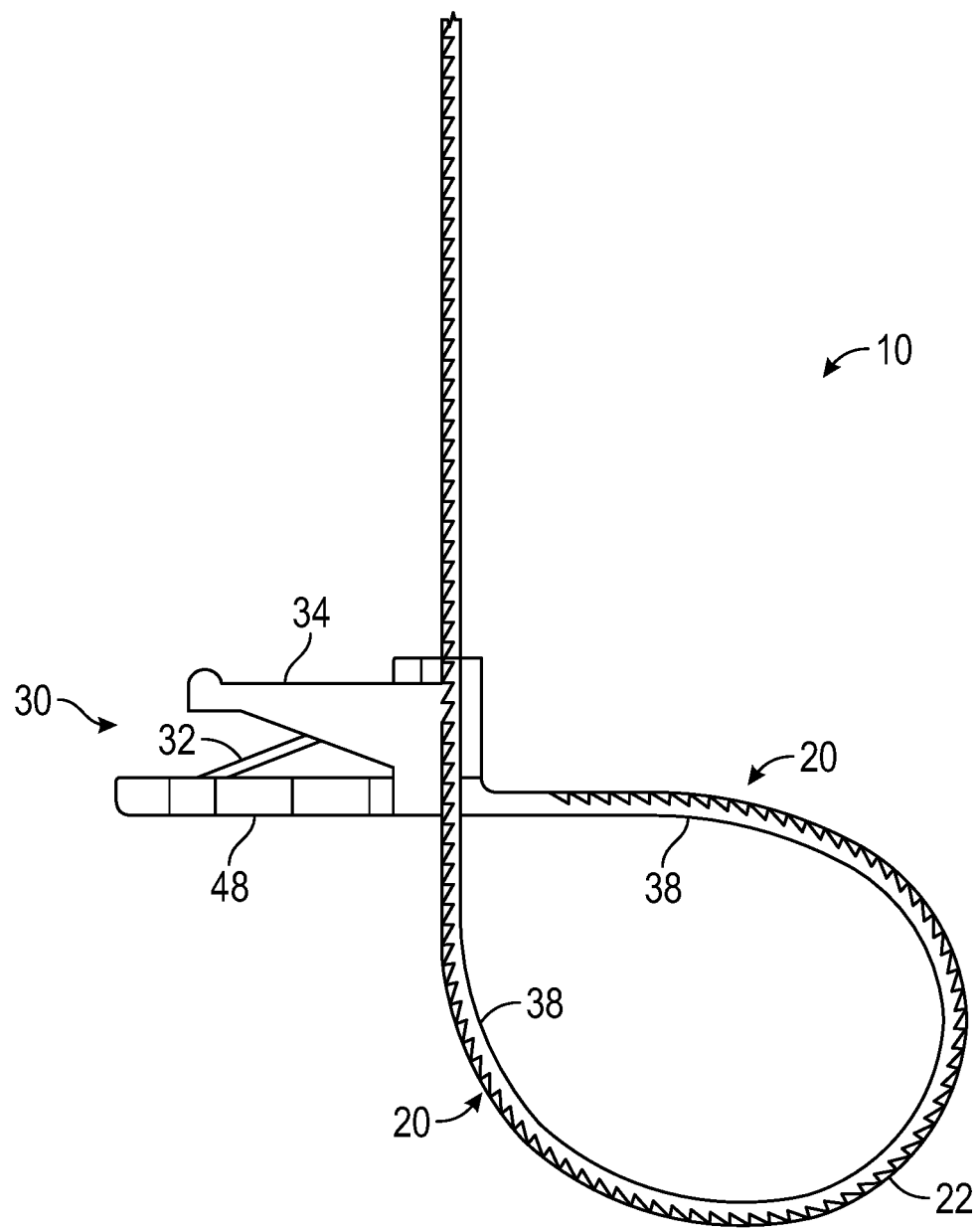
FIG. 5 illustrates cross-sectional side view of an example releasable cable tie in locked position, according to one embodiment.

A zip tie to secure items therewithin that can be loosened and/or released to allow the items to be removed therefrom and then be reused. The zip tie includes an elongated strap having teeth formed thereon that engage with teeth in a locking head to allow movement in only one direction (tightening). The locking head also includes a releasing mechanism that enables the teeth in the locking head to be disengaged from the teeth on the elongated strap so that the strap can move in an opposite direction that enables loosening of the strap or removal of the strap. The release mechanism is configured to face away from the items secured within the strap to provide more room for engagement (e.g., by a user's hand), enable a user to engage therewith whether wearing gloves or not, provide necessary leverage to release the cable tie without need to press the tie against other items (e.g., cables, chassis), and provide an option for securing excess strap therewithin.

FIG. 1 illustrates a top view of an example releasable tie 10 that can be used as an adjustable tightening apparatus. The tie includes an elongated planar strap 20 and a releasable locking head 30. The strap 20 has a first end 14 that is connected to the locking head 30 and a second end 16. The strap 20 has an elongated length 18 and releasing locking teeth 22 formed within guide rails 24 on a first (e.g., top) side thereof. The second end 16 of the of strap 20 includes a tongue 26 that does not include teeth. The tongue 26 and the guide rails 24 assist in guiding the strap 20 into the locking head 30.

The locking head 30 includes a main body 11 (wider than the strap 20) having an opening 12 formed therein to enable the strap 20 to pass therethrough. A release tab 34 pivotally extends from a releasable latch (not visible). When depressed the release tab 34 disengages the releasable latch from the strap 20 to enable the strap 20 to be removed therefrom. The release tab 34 is configured to be accessible to a user's finger and support a portion of a user's finger to enable a user to depress the release tab 34. The release tab 34 may include a ripple strip raised portion) 36 at a far end thereof to prevent a user's finger from slipping thereof or to secure thereto. A backplate 48 extends from a bottom of the main body 11. The backplate 48 is configured to be accessible to a user's finger and support a portion of a user's finger to enable a user to provide support (e.g., resistance) when the release tab 34 is being depressed. Backplate side walls 32 may extend from the main body 11 to provide support therefore.

FIG. 2 illustrates a close-up top view of an example releasable tie 10 that can be used as an adjustable tightening apparatus. The close-up view illustrates the opening 12 formed within the main body 11 and how a portion 44 of the release tab 34 extends into the opening 12. The close-up view also illustrates that the backplate may include an open interior 56 that enables the release tab 34 to be pass therethrough when depressed. The open interior 56 may also provide a edge for a user's finger to secure thereto. Furthermore, according to one embodiment the open interior 56 may be used to secure excess strap therein. That is, the excess strap 20 that passes through the locking head 30 may be looped back and pass through the open interior 56 to secure it in place. This arrangement, may provide a barrier to the release tab 34 inadvertently being depressed and releasing the strap 20. Moreover, the open interior could be used to secure the strap to an object (e.g., chassis).

FIG. 3 illustrates a cross-sectional side view of an example releasable tie 10 that can be used as an adjustable tightening apparatus. The cross-sectional view illustrates one or more teeth 58 that are part of a releasable latch that extends into the opening 12 to engage with one or more of the strap teeth 22. The configuration of the one or more teeth 58 enable the strap to traverse the opening 12 in one direction (a tightening direction) but not in a second direction (a release or removable direction).

FIG. 4 illustrates a close-up cross-sectional side view of an example releasable tie 10 that can be used as an adjustable tightening apparatus. The release tab 34 rests on a fulcrum 62 located below the one or more teeth 56 of the releasable latch. The fulcrum 62 acts as a pivot point so that when the release tab 34 is depressed, the one or more teeth 58 more upward and backward until they disengage with the one or more strap teeth 28. When the teeth 58 and the teeth 28 are disengaged the strap 20 may be moved in the second direction (release or removable direction).

FIG. 5 illustrates cross-sectional side view of an example releasable tie in locked position. When the strap 20 passes through the locking head 30 a loop is formed for tightening around items to, for example, secure them in place. The teeth 22 of the strap 20 are located on a outside of the loop and a smooth bottom 38 of the strap faces the loop and the items secured therein. The release tab 34 and the backplate 48 of the locking head 30 extend substantially perpendicular to the strap 20 in a direction away from the loop. The location of the release tab 34 and the backplate 48 provides a user easy access thereto.

The example releasable tie 10 preferably is molded in one piece integrally from thermoplastic, such as nylon or polypropylene and possesses sufficient strength and resiliency to permit the desired working thereof as well as the desired latching and release.

Figure 6D:
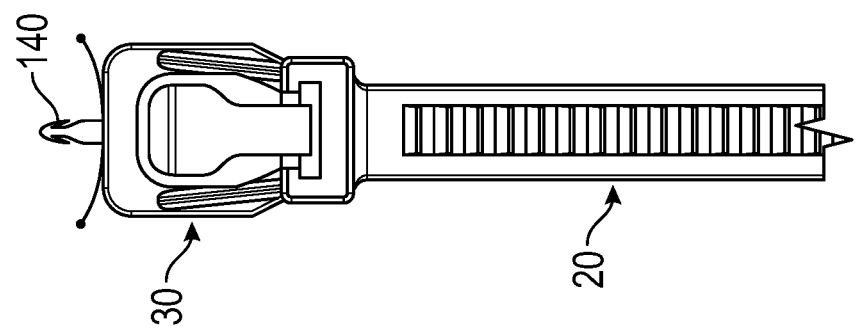
FIG. 6A-H illustrate top views of various embodiments of an example releasable tie with additional features included.
Figure 6C:
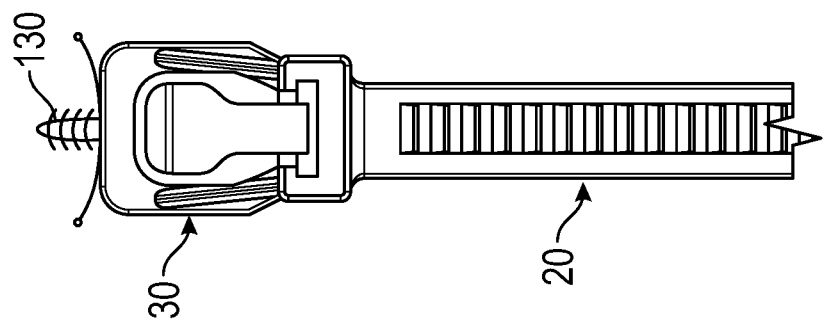
Figure 6B:
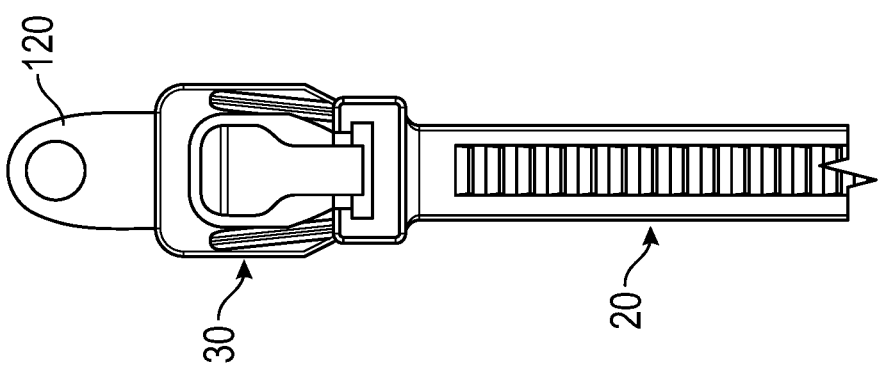
Figure 6A:
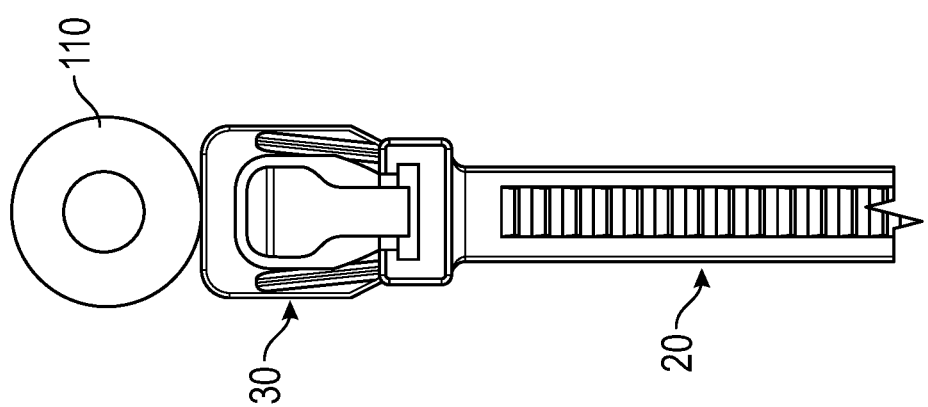

FIG. 6A-H illustrate top view of various embodiments of an example releasable tie with additional features included. FIG. 6A illustrates an embodiment that includes an eye loop 110 extending from the backplate (not numbered) of the locking head 30. The eye loop 110 may be used to receive a screw, nail, rivet or the like therethrough to secure the tie to an item (e.g., chassis). Alternatively, the eye loop 110 may be utilized to secure around a hook, tab, pin or the like that is extending from an item that the tie is to be secured to. FIG. 6B illustrates an embodiment that includes a mounted head 120 extending from the backplate (not numbered) of the locking head 30. The mounted head 120 includes a hole formed therethrough so that the mounted head 120 can be utilized in similar fashion to the eye loop 110 of FIG. 1A.

FIG. 6C illustrates an embodiment that includes an screw push mount 130 extending from the backplate (not numbered) of the locking head 30. The screw push mount 130 can be utilized to secure the tie to an item (e.g., chassis) by screwing the push mount 130 into a threaded hole formed therein. FIG. 6D illustrates an embodiment that includes a pin push mount 140 extending from the backplate (not numbered) of the locking head 30. The pin push mount 140 may include flanges (not numbered at an end thereof). The pin push mount 140 can be utilized to secure the tie to an item (e.g., chassis) by pushing the push mount 140 through a hole formed therein where the flanges secure the tie within the hole.

Figure 6H:
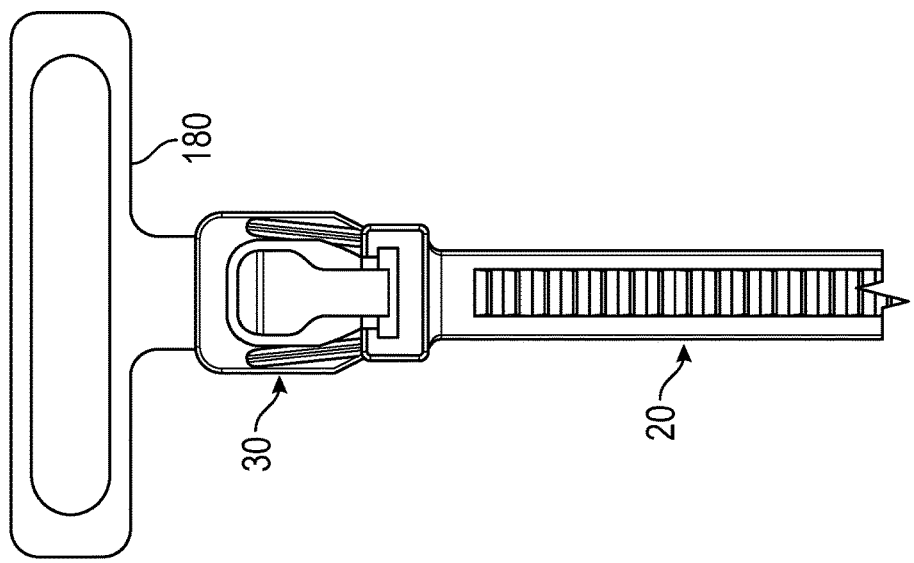
Figure 6G:
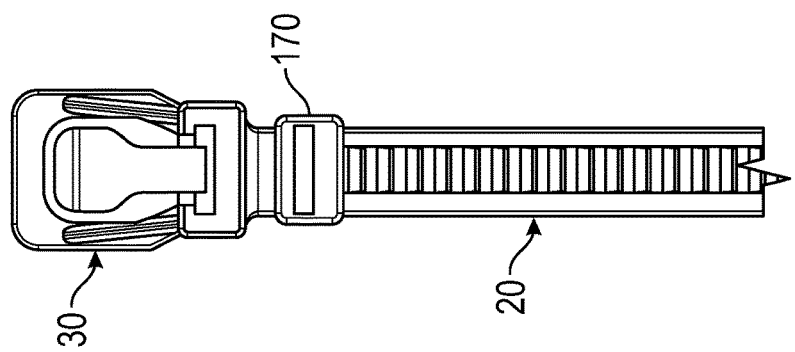
Figure 6F:
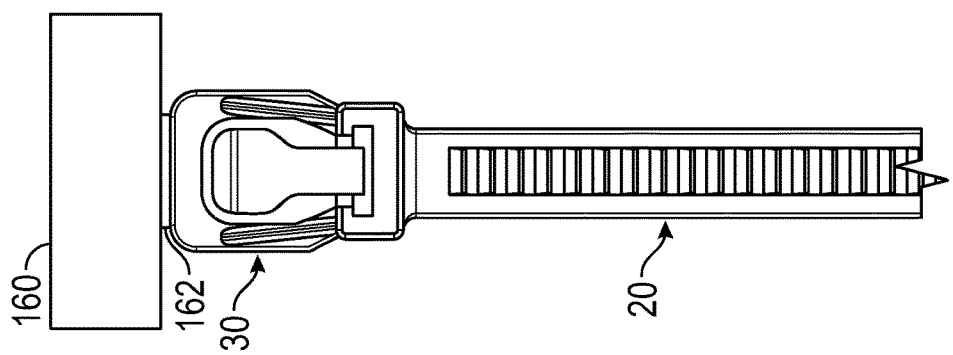
Figure 6E:
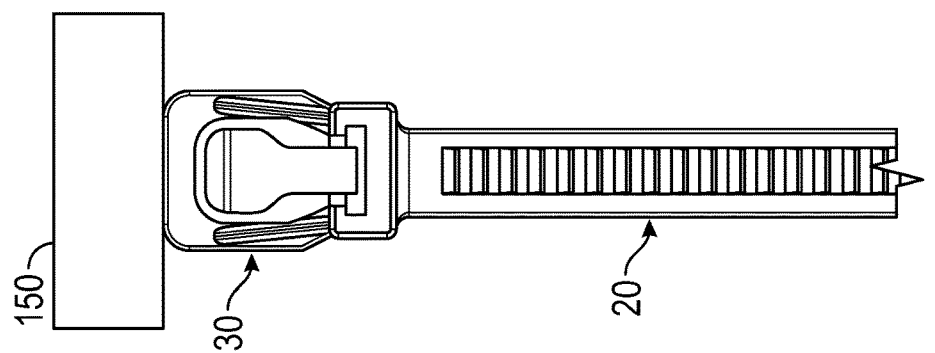

FIG. 6E-F illustrates embodiments that include labels 150, 160 respectively extending from the backplate (not numbered) of the locking head 30. The labels may be used to identify the items that are secure therein. The label 150 may extend directly from the backplate while the label 160 may include a tab 162 that extends from the backplate and the label 160 extends from the tab 162.

FIG. 6G illustrates an embodiment that includes a passthrough 170 formed on a portion of the strap 20 prior to the locking head 30. The passthrough 170 may enable the strap to pass therethrough to, for example, secure the tie to an item it is to be utilized with before the apparatus is tightened in use. For example, the tie may be secured to an end of a power cord by passing the strap 20 through the passthrough 170 so that the tie is located on the power cord when the power cord is in use and is already in place when the power cord is wrapped for storage. By way of another example, the tie may be secured to an item (e.g., chassis, desk) that will have a plurality of cables traversing thereby. Once the cables are run the tie can be used to secure the cables in an organized fashion to the item.

According to one embodiment, the passthrough 170 may include a means for holding the strap in place on the item it is to be used with. According to one embodiment, the passthrough 170 does not include teeth to lock the strap 20 therein so the strap 20 may be capable of passing through the passthrough 170 in either direction. The passthrough 170 is illustrated as being located in proximity to the locking head 30 but is in no way intended to be limited thereby.

FIG. 6H illustrates an embodiment that includes a handle 180 extending from the backplate (not numbered) of the locking head 30. The handle 180 may be used for carrying items that have been bundled together. For example, the handle 180 could be utilized to carry a power cord that has been wrapped and secured together with the tie.

The example releasable tie described herein could include additional features without departing from the scope thereof. While the example releasable tie has been described with respect to securing cables together and/or to items that the cables traverse the releasable ties are in no way intended to be limited thereto. Rather the releasable ties can be utilized to secure and types of items together or to other items without departing from the current scope as the use of the release tab and backplate provides for a comfortable two finger release, whether the user is wearing gloves or not and whether the user suffers from arthritis or any other condition that limits the use of the user's fingers. For example, the releasable ties could be utilized to secure luggage to a roof rack, to tie ends of material together, to secure a tag to equipment, and/or to secure a bag with a broken zipper together.

According to one embodiment, the releasable ties could be utilized in the medical field. For example, the releasable tie could be utilized as a tourniquet. A user could easily tighten or loosen the strap as needed around a limb to apply necessary pressure to control venous and arterial circulation. Once the desired amount of tension is reached, the strap will easily lock into place holding the pressure to the limb for any period of time. The user can then relieve or tighten pressure as needed to avoid tissue damage.

Although the invention has been illustrated by reference to specific embodiments, it will be apparent that the invention is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

The invention claimed is:

1. An adjustable tightening apparatus, comprising:
    an elongated planar strap having a plurality of strap teeth formed on one side thereof; and
    a releasable locking head formed adjacent to a first end of the strap, wherein the locking head includes
    a main body having an opening formed therethrough to receive a second end of the strap in a locking direction to form a loop to secure around one or more items such that the strap teeth are positioned external to the loop and away from the one or more items, and wherein amount of the strap that traverses the opening controls size of the loop;
    a releasable latch extending into the opening, wherein the releasable latch includes at least one lock tooth complementary to the strap teeth and adapted to engage with at least one strap tooth for preventing movement of the strap in a release direction, and wherein the releasable latch is secured to a fulcrum;
    a release tab having a first side connected to the releasable latch and a second side extending away from the first side of the strap, wherein the release tab is accessible by a user and configured to be depressed by the user to cause the releasable latch and the at least one lock tooth to pivot away from the opening and release the at least one lock tooth from engagement with the at least one strap tooth to permit the strap to be moved in the release direction; and
    a backplate connected to a lower end of the main body and extending away from the first side of the strap, wherein the backplate includes sidewalls extending from sides of the main body, wherein the backplate is accessible by the user and configured for the user to provide support thereto to provide resistance when the release tab is depressed toward the backplate, and wherein the release tab and the backplate extend away from the loop when the strap is in the opening.

2. The apparatus of claim 1, wherein the release tab includes a ripple strip toward the second end thereof, wherein the ripple strip is to engage a finger of the user.

3. The apparatus of claim 1, wherein the backplate includes an open interior, wherein the open interior is to engage a finger.

4. The apparatus of claim 3, wherein the second end of the strap extending past the releasable locking head can be looped back and secured within the open interior.

5. The apparatus of claim 1, wherein the user can pinch the release tab and the backplate toward each other to disengage the releasable locking head.

6. The apparatus of claim 1, wherein the releasable locking head further includes a mounting head to secure the apparatus to an item.

7. The apparatus of claim 1, wherein the releasable locking head further includes a push mount to secure the apparatus to an item.

8. The apparatus of claim 1, wherein the releasable locking head further includes a label to identify the one or more items secured therein.

9. The apparatus of claim 1, wherein the releasable locking head further includes a handle to carry the one or more items secured therein.

10. The apparatus of claim 1, further comprising a pass through to enable the strap to pass therethrough to secure the apparatus to an item that it will be utilized with.

11. The apparatus of claim 1, wherein the one or more items include cables.

12. The apparatus of claim 1, wherein the one or more items include cables and a structure with which the cables are secured to.

13. The apparatus of claim 1, wherein the one or more items is a limb and the apparatus is used as a tourniquet.

14. A method of securing one or more items, the method comprising:
    providing an adjustable tightening apparatus of claim 1;
    securing the strap around the one or more items when the one or more items are to be secured by inserting the second end of the strap into the opening in the main body of the releasable locking head in the locking direction and forming the loop to receive the one or more items, wherein the plurality of strap teeth are positioned external to the loop and away from the one or more items, and wherein amount of the strap that traverses the opening controls size of the loop; and
    locking the strap in the releasable locking head by engaging the at least one lock tooth formed in the releasable latch with the at least one of the plurality of strap teeth; and
    releasing the strap from around the one or more items when the one or more items are to be released by depressing with a first finger the release tab while placing a second finger on the backplate to provide resistance while the release tab is being depressed to disengage the least one lock tooth from the at least one strap tooth; and
    securing the release tab and the backplate of the releasable locking head between the first and the second finger and pulling the releasable locking head in a direction away from the loop.

15. The method of claim 14, further comprising looping back the second end of the strap that traversed the releasable locking head and securing it within an open interior of the backplate.

16. The method of claim 14, further comprising mounting the adjustable tightening apparatus to an item with a mounting head extending from the releasable locking head.

17. The method of claim 14, further comprising mounting the adjustable tightening apparatus to an item with a push mount extending from the releasable locking head.

18. The method of claim 14, further comprising identifying the one or more items secured in the adjustable tightening apparatus on a label extending from the releasable locking head.

19. The method of claim 14, wherein the one or more items include cables.

20. The method of claim 14, wherein the one or more items include cables and a structure with which the cables are secured to.

21. An adjustable tightening apparatus, comprising:
- an elongated planar strap having a plurality of strap teeth formed on one side thereof; and
- a releasable locking head formed adjacent to a first end of the strap, wherein the locking head includes
  - a main body having an opening formed therethrough to receive a second end of the strap in a locking direction to form a loop to secure around one or more items such that the strap teeth are positioned external to the loop and away from the one or more items, and wherein amount of the strap that traverses the opening controls size of the loop;
  - a releasable latch extending into the opening, wherein the releasable latch includes at least one lock tooth complementary to the strap teeth and adapted to engage with at least one strap tooth for preventing movement of the strap in a release direction, and wherein the releasable latch is secured to a fulcrum;
  - a release tab having a first side connected to the releasable latch and a second side extending away from the first side of the strap, wherein the release tab is accessible by a user and configured to be depressed by the user to cause the releasable latch and the at least one lock tooth to pivot away from the opening and release the at least one lock tooth from engagement with the at least one strap tooth to permit the strap to be moved in the release direction; and
  - a backplate connected to a lower end of the main body and extending away from the first side of the strap, wherein the backplate is accessible by the user and configured for the user to provide support thereto to provide resistance when the release tab is depressed toward the backplate, wherein the backplate includes an open interior below the release tab, and wherein the release tab and the backplate extend away from the loop when the strap is in the opening.

22. The apparatus of claim 21, wherein the open interior is to provide an edge to engage a finger of the user.

23. The apparatus of claim 21, wherein the open interior is to enable the second end of the strap extending past the releasable locking head to be looped back and secured there within.

* * * * *